UNITED STATES PATENT OFFICE.

KURT DESAMARI, OF ELBERFELD, GERMANY, ASSIGNOR TO FARBENFABRIKEN VORM. FRIEDR. BAYER & CO., OF ELBERFELD, GERMANY, A CORPORATION OF GERMANY.

AZO COLOR.

1,051,565.　　　Specification of Letters Patent.　　Patented Jan. 28, 1913.

No Drawing.　　Application filed April 9, 1912.　Serial No. 689,632.

*To all whom it may concern:*

Be it known that I, KURT DESAMARI, doctor of technical arts, chemist, citizen of the German Empire, residing at Elberfeld, Germany, have invented new and useful Improvements in Azo Colors, of which the following is a specification.

My invention relates to the manufacture and production of a new azo color which is prepared by the combination of the diazo compound of 5-nitro-2-anisidin with aceto-acetic-acid-ortho-chloro-anilid ($CH_3$—CO—$CH_2$—CONH—$C_6H_4$—Cl). It is after being dried and pulverized a yellow powder insoluble in water, soluble in concentrated sulfuric acid with a yellow coloration.

The lakes prepared from this dye are of a pure brilliant greenish-yellow distinguished by their fastness to light.

In order to illustrate the new process more fully the following examples are given, the parts being by weight:—

1. 168 parts of 5-nitro-2-anisidin are diazotized and sodium acetate is added to the resulting diazo solution to neutralize the free mineral acid. The diazo compound is then poured into an aqueous suspension of 211.5 parts of aceto-acetic-acid-ortho-chloro-anilid containing 750 parts of a 20 per cent. sodium acetate solution and the dye is filtered off and dried.

The following represents graphically the structural formula which this dye is considered to possess:

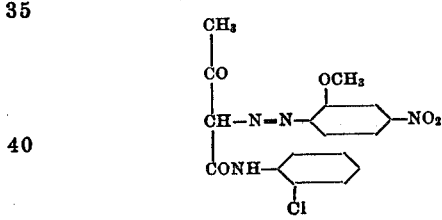

2. Mix intimately 100 parts of a finely ground heavy spar with a solution of 20 parts of aluminum sulfate in 1200 parts of hot water and add thereto a boiling suspension of 6 parts of the azo dye obtained according to the first example in 1000 parts of water containing 10 parts of anhydrous sodium carbonate, boil the mixture and add to it while it is being stirred a hot solution of 30 parts of crystallized $BaCl_2$ in 300 parts of water. Boil, filter off and wash. The color of this lake is greenish-yellow.

The lakes and the coloring matter can also be produced in one operation.

The hitherto unknown aceto-acetic-acid-ortho-chloro-anilid can be obtained by heating orthd-chloro-anilin with aceto-acetic-ester *e. g.* with boiling naphtha. It melts at 105° C.

I claim:—

As a new product the new dyestuff derived from diazotized 5-nitro-2-anisidin and aceto-acetic-acid-orth-chloro-anilid having most probably the following graphically represented formula:

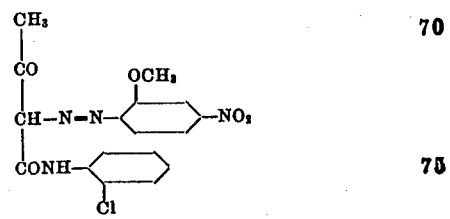

which is after being dried and pulverized a powder insoluble in water, soluble in concentrated sulfuric acid with a yellow color; and furnishing valuable color lakes, substantially as described.

In testimony whereof I have hereunto set my hand in the presence of two subscribing witnesses.

KURT DESAMARI. [L. S.]

Witnesses:
　HELEN NUFER,
　ALBERT NUFER.